United States Patent
Tsai

(10) Patent No.: US 11,799,404 B1
(45) Date of Patent: Oct. 24, 2023

(54) MOTOR CONTROLLER CIRCUIT HAVING ROTATIONAL SPEED LOCKING MECHANISM

(71) Applicant: ANPEC ELECTRONICS CORPORATION, Hsinchu (TW)

(72) Inventor: Ming-Jung Tsai, Changhua County (TW)

(73) Assignee: ANPEC ELECTRONICS CORPORATION, Hsinchu (TW)

( * ) Notice: Subject to any disclaimer, the term of this patent is extended or adjusted under 35 U.S.C. 154(b) by 0 days.

(21) Appl. No.: 17/845,984

(22) Filed: Jun. 21, 2022

(30) Foreign Application Priority Data

May 11, 2022 (TW) .................................. 111117573

(51) Int. Cl.
G05B 1/06 (2006.01)
H02P 6/15 (2016.01)

(52) U.S. Cl.
CPC ........................................ *H02P 6/15* (2016.02)

(58) Field of Classification Search
CPC ......................................................... H02P 6/15
See application file for complete search history.

(56) References Cited

U.S. PATENT DOCUMENTS

| | | | |
|---|---|---|---|
| 5,177,416 A * | 1/1993 | Inaji | H02P 6/21 318/431 |
| 10,348,228 B1 * | 7/2019 | Yang | H02P 6/28 |
| 2006/0082339 A1 * | 4/2006 | Hamaoka | H02P 6/08 318/400.21 |
| 2014/0021895 A1 * | 1/2014 | Ohgushi | H02P 6/182 318/400.26 |
| 2021/0067068 A1 | 3/2021 | Tsai et al. | |
| 2021/0075348 A1 * | 3/2021 | Chen | H02P 6/182 |
| 2021/0091688 A1 * | 3/2021 | Chen | H02P 6/182 |

FOREIGN PATENT DOCUMENTS

TW 202110073 A 3/2021

\* cited by examiner

*Primary Examiner* — Kawing Chan
*Assistant Examiner* — Gabriel Agared
(74) *Attorney, Agent, or Firm* — Li & Cai Intellectual Property Office

(57) ABSTRACT

A motor controller circuit having a rotational speed locking mechanism is provided. Each time when a motor commutates, a first signal generating circuit resets a first waveform signal and a second signal generating circuit resets a second waveform signal. An output signal generating circuit outputs a waveform output signal according to the first waveform signal and the second waveform signal. A motor controller circuit outputs an on-time signal according to the waveform output signal. A motor driving circuit outputs a driving signal to the motor to drive the motor to rotate according to the on-time signal.

9 Claims, 6 Drawing Sheets

WS1

WS21

MOTOR CONTROLLER CIRCUIT HAVING ROTATIONAL SPEED LOCKING MECHANISM

CROSS-REFERENCE TO RELATED PATENT APPLICATION

This application claims the benefit of priority to Taiwan Patent Application No. 111117573, filed on May 11, 2022. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a motor, and more particularly to a motor controller circuit having a rotational speed locking mechanism.

BACKGROUND OF THE DISCLOSURE

In electronic devices, fans are used to cool heat generating components such as processors. When the heat generating components are cooled down by the fans, data from circuits of the fans must be instantly obtained so as to precisely control rotational speeds of motors of the fans according to the obtained data, such that the fans can properly cool down the heat generating components with efficiency. However, a conventional motor controller circuit cannot drive the motor to stably rotate at a target rotational speed under the condition that only low noise can be generated by the motor.

SUMMARY OF THE DISCLOSURE

In response to the above-referenced technical inadequacies, the present disclosure provides a motor controller circuit having a rotational speed locking mechanism. The motor controller is applicable to a motor. The motor controller circuit includes a signal generator circuit, an output signal generating circuit, a motor control circuit and a motor driving circuit. The signal generator circuit includes a first signal generating circuit and a second signal generating circuit. The first signal generating circuit is configured to output a first waveform signal. The first signal generating circuit is configured to reset the first waveform signal according to a commutation state of the motor each time when the motor commutates. The second signal generating circuit is configured to output a second waveform signal. The output signal generating circuit is connected to the first signal generating circuit and the second signal generating circuit. The output signal generating circuit is configured to output a waveform output signal, according to the first waveform signal from the first signal generating circuit and the second waveform signal from the second signal generating circuit. The motor control circuit is connected to the output signal generating circuit. The motor control circuit is configured to output an on-time signal according to the waveform output signal from the output signal generating circuit. The motor driving circuit is connected to the motor control circuit and the motor. The motor driving circuit is configured to output a driving signal to the motor to drive the motor to rotate according to the on-time signal.

In certain embodiments, each time when the motor commutates at one of a plurality of commutation time points of the motor, by the first signal generating circuit, waveforms of the first waveform signal outputted within a time interval between the one and a next one of the plurality of commutation time points are the same as that outputted within a time interval between the one and a previous one of the plurality of commutation time points.

In certain embodiments, a rising edge of a first one of a plurality of waveforms of the on-time signal outputted by the motor control circuit is aligned with a commutation time point of the motor.

In certain embodiments, each time when the motor commutates, the second signal generating circuit resets the second waveform signal according the commutation state of the motor.

In certain embodiments, each time when the motor commutates, the signal generating circuit synchronously outputs the first waveform signal and the second waveform signal.

In certain embodiments, each time when the motor commutates at one of a plurality of commutation time points of the motor, by the second signal generating circuit, waveforms of the second waveform signal outputted within a time interval between the one and a next one of the plurality of commutation time points are the same as that outputted within a time interval between the one and a previous one of the plurality of commutation time points.

In certain embodiments, waveforms of the first waveform signal include triangular waveforms, sawtooth waveforms or a combination thereof, and waveforms of the second waveform signal include sine waveforms, third harmonic waveforms or a combination thereof.

In certain embodiments, each time when the motor commutates at one of a plurality of commutation time points of the motor, by the motor control circuit, duty cycles of the on-time signal outputted within a time interval between the one and a next one of the plurality of commutation time points are the same as that outputted within a time interval between the one and a previous one of the plurality of commutation time points, under the condition that the motor stably rotates at a constant rotational speed.

In certain embodiments, the output signal generating circuit compares a value of the first waveform signal with a value of the second waveform signal at each of a plurality of time points to determine a level of the on-time signal at each of the plurality of time points.

In certain embodiments, when the output signal generator determines that a value of the first waveform signal is larger than a value of the second waveform signal, the motor control circuit outputs the on-time signal at a low level. When the output signal generator determines that the value of the first waveform signal is smaller than the value of the second waveform signal, the motor control circuit outputs the on-time signal at a high level.

As described above, the present disclosure provides the motor controller circuit having the rotational speed locking mechanism. The waveforms (such as the triangular waveforms and the third harmonic waveforms) of the plurality of waveform signals are reset by the motor controller circuit of the present disclosure. Each time when the motor commutates at the one of the plurality of commutation time points of the motor, by the motor controller circuit of the present disclosure, the duty cycles of the on-time signal outputted within the time interval between the one and the next one of the plurality of commutation time points are the same as that outputted within the time interval between the one and the previous one of the plurality of commutation time points. As a result, the motor is driven to stably rotate at the same rotational speed by the motor controller circuit of the present disclosure, under the condition that noise generated by blades of a fan that are driven by the motor of the fan is reduced.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
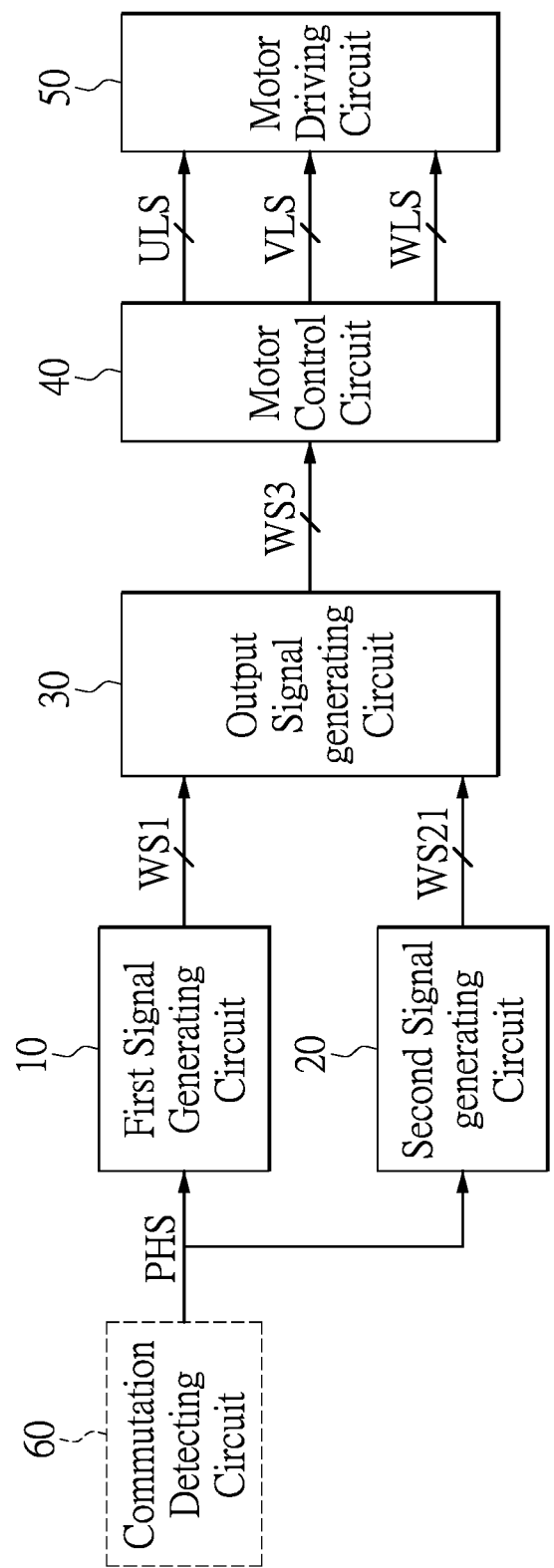
FIG. 1 is a block diagram of a motor controller circuit having a rotational speed locking mechanism according to an embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Figure 2:
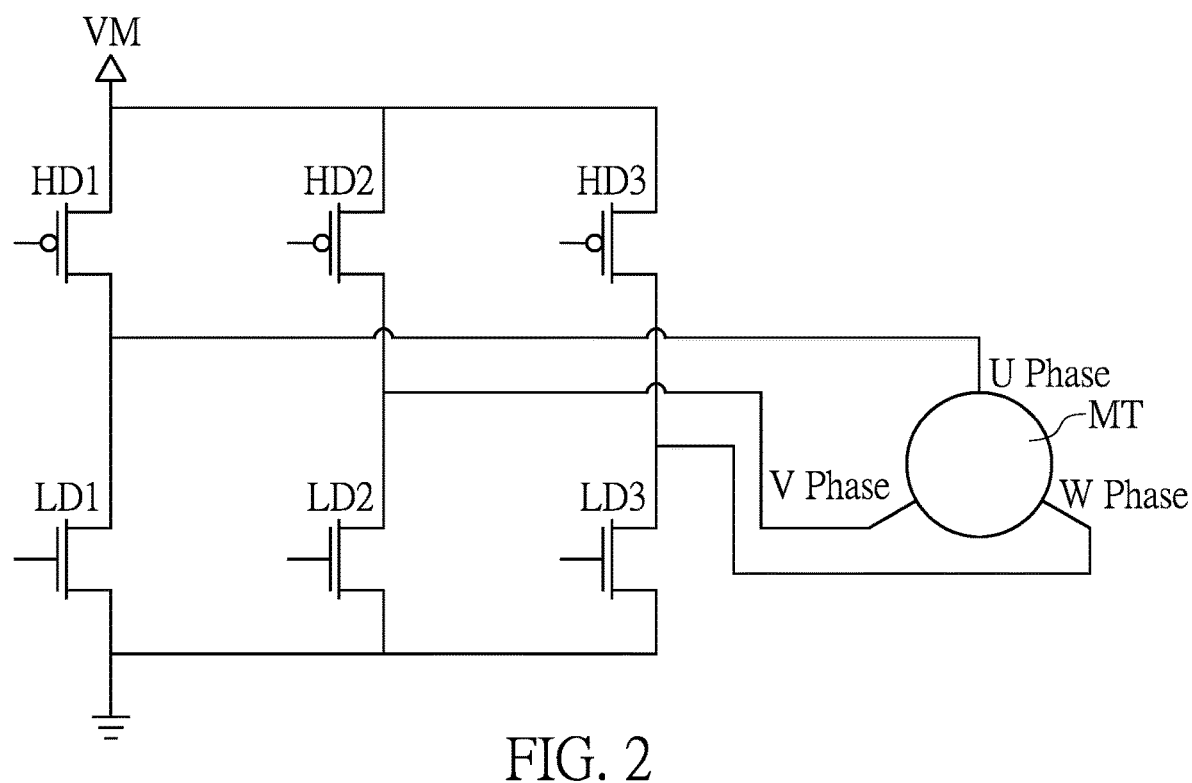
FIG. 2 is a circuit diagram of a bridge circuit of the motor controller circuit having the rotational speed locking mechanism according to the embodiment of the present disclosure.
Figure 3:
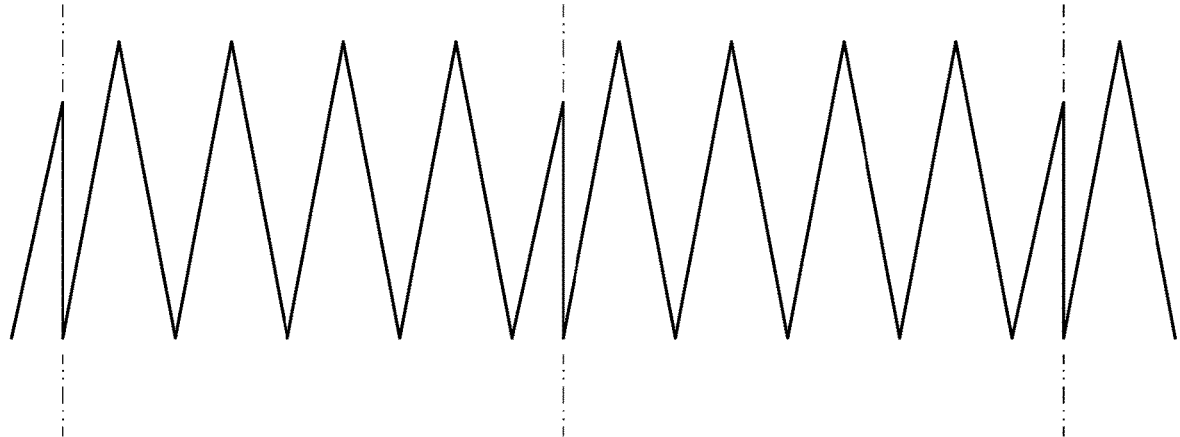
FIG. 3 is a waveform diagram of a signal of the motor controller circuit having the rotational speed locking mechanism according to the embodiment of the present disclosure.
Figure 4:
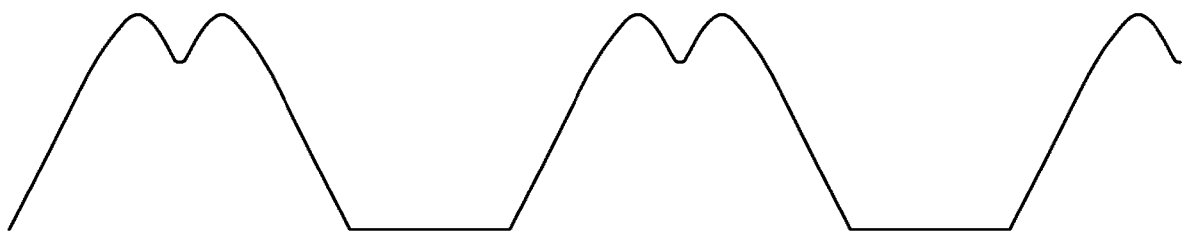
FIG. 4 is a waveform diagram of a signal of the motor controller circuit having the rotational speed locking mechanism according to the embodiment of the present disclosure.
Figure 5:
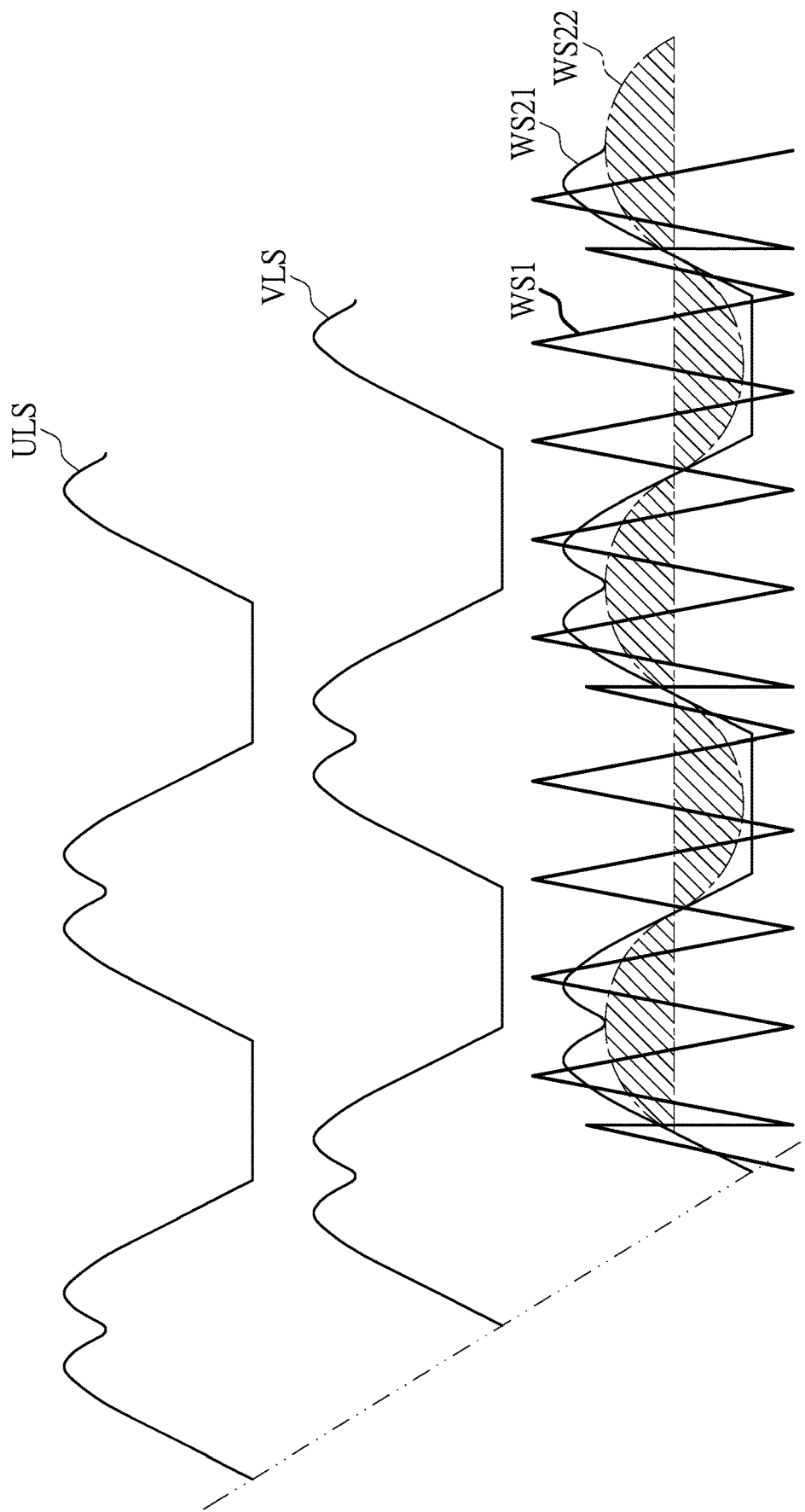
FIG. 5 is a waveform diagram of signals of the motor controller circuit having the rotational speed locking mechanism according to the embodiment of the present disclosure.

Reference is made to FIGS. 1 to 5, in which FIG. 1 is a block diagram of a motor controller circuit having a rotational speed locking mechanism according to an embodiment of the present disclosure, FIG. 2 is a circuit diagram of a bridge circuit of the motor controller circuit having the rotational speed locking mechanism according to the embodiment of the present disclosure, and FIGS. 3 to 5 are waveform diagrams of signals of the motor controller circuit having the rotational speed locking mechanism according to the embodiment of the present disclosure.

The motor controller circuit of the embodiment of the present disclosure may include a signal generator circuit (that may include a plurality of signal generating circuit such as a first signal generating circuit 10 and a second signal generating circuit 20 as shown in FIG. 1), an output signal generating circuit 30, a motor control circuit 40 and a motor driving circuit 50 as shown in FIG. 1.

For example, one or both of the first signal generating circuit 10 and the second signal generating circuit 20 may be oscillator circuits that can be reset. The output signal generating circuit 30 may be connected to the first signal generating circuit 10 and the second signal generating circuit 20 and the motor control circuit 40. The motor control circuit 40 may be connected to the motor driving circuit 50. The motor driving circuit 50 may be connected to the motor MT such as a three-phase motor.

In detail, the motor driving circuit 50 may include a bridge circuit. The bridge circuit may include a plurality of switch components. The switch components may include a plurality of high-side switches such as a first high-side switch HD1, a second high-side switch HD2 and a third high-side switch HD3 as shown in FIG. 2, and a plurality of low-side switches such as a first low-side switch LD1, a second low-side switch LD2 and a third low-side switch LD3 as shown in FIG. 2.

A first terminal of the first high-side switch HD1, a first terminal of the second high-side switch HD2 and a first terminal of the third high-side switch HD3 may be coupled to a common voltage VM. A second terminal of the first high-side switch HD1 may be connected to a first terminal of the first low-side switch LD1. A second terminal of the second high-side switch HD2 may be connected to a first terminal of the second low-side switch LD2. A second terminal of the third high-side switch HD3 may be connected to a first terminal of the third low-side switch LD3. A second terminal of the first low-side switch LD1, a second terminal of the second low-side switch LD2 and a second terminal of the third low-side switch LD3 may be grounded.

A node between the second terminal of the first high-side switch HD1 and the first terminal of the first low-side switch LD1 may be connected to a first terminal such as a U-phase terminal of the motor MT. A node between the second terminal of the second high-side switch HD2 and the first terminal of the second low-side switch LD2 may be connected to a second terminal such as a V-phase terminal of the motor MT. A node between the second terminal of the third high-side switch HD3 and the first terminal of the third low-side switch LD3 may be connected to a third terminal such as a W-phase terminal of the motor MT.

The motor control circuit 40 may be connected to a control terminal of each of the high-side switches (such as the first high-side switch HD1, the second high-side switch HD2 and the third high-side switch HD3). The motor control circuit 40 may be connected to a control terminal of each of the low-side switches (such as the first low-side switch LD1, the second low-side switch LD2 and the third low-side switch LD3). The output signal generating circuit 30 may turn on or off each of the high-side switches and the low-side switches.

First, when the motor MT must be driven to rotate, the first signal generating circuit 10 may output a first waveform signal WS1 as shown in FIG. 3 to the output signal generating circuit 30, and the second signal generating circuit 20 may output a second waveform signal WS21 as shown in FIG. 4 to the output signal generating circuit 30.

For example, waveforms of the first waveform signal WS1 may include triangular waveforms as shown in FIG. 3, sawtooth waveforms or a combination thereof, and waveforms of the second waveform signal WS21 may include third harmonic waveforms as shown in FIG. 4, sine waveforms, or a combination thereof, but the present disclosure is not limited thereto.

The output signal generating circuit 30 may output a waveform output signal WS3 according to the first waveform signal WS1 from the first signal generating circuit 10 and the second waveform signal WS21 from the second signal generating circuit 20.

Figure 6:
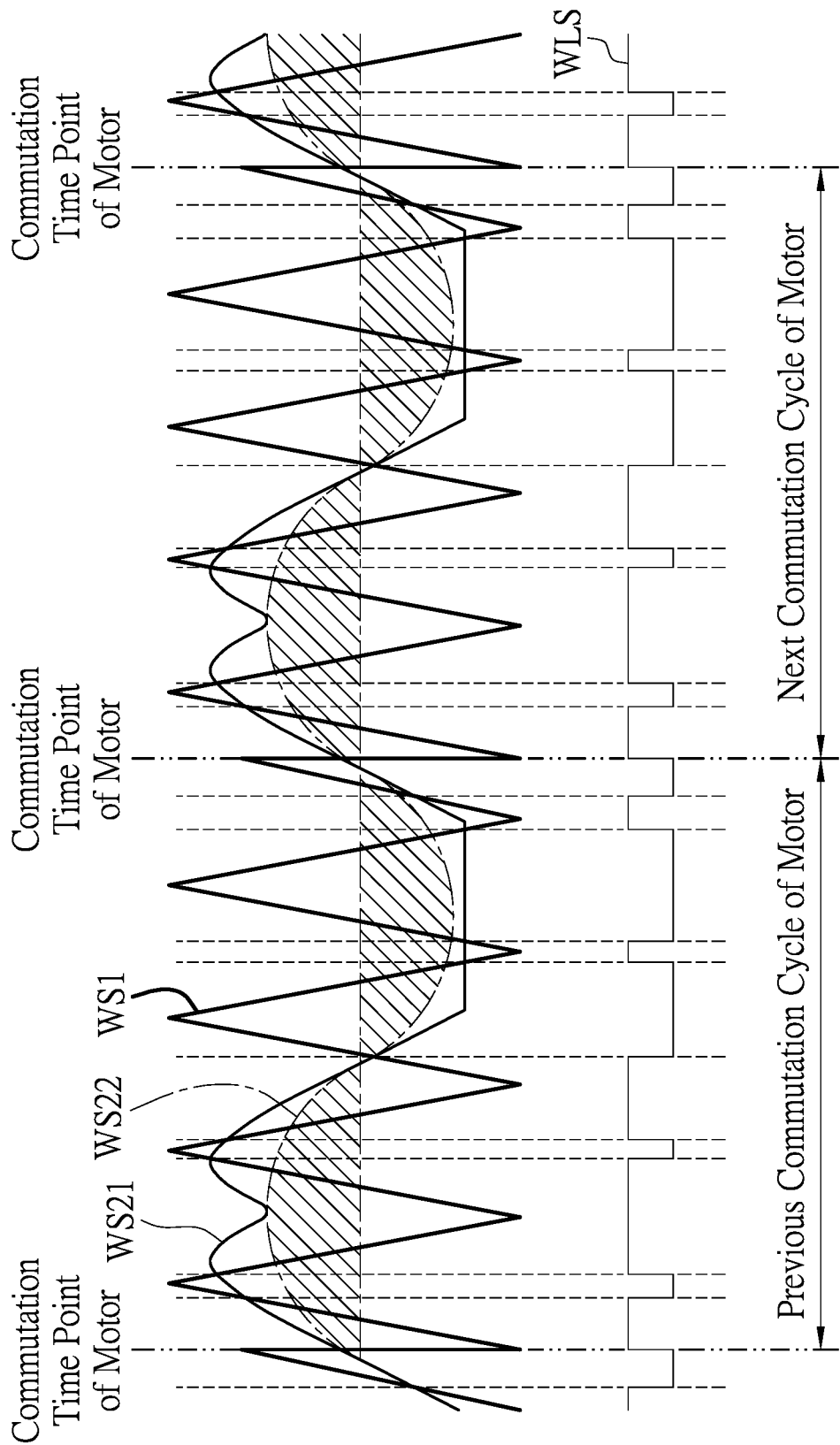
FIG. 6 is a waveform diagram of signals of the motor controller circuit having the rotational speed locking mechanism according to the embodiment of the present disclosure.

Finally, the motor control circuit 40 may output an on-time signal WLS as shown in FIG. 6 to the control terminal of the high-side switch connected to one of the terminals of the motor MT (such as, but not limited thereto, the third high-side switch HD3 connected to the W-phase terminal of the motor MT), according to the waveform output signal WS3 from the output signal generating circuit 30. The bridge circuit is controlled to drive the motor MT to rotate according to the on-time signal WLS. In addition, the motor control circuit 40 may output other on-time signals to others of the switch components of the motor driving circuit 50 connected to the motor MT, according to other output signals from the output signal generating circuit 30. For example, the motor control circuit 40 may output an on-time signal ULS as shown in FIG. 5 to the first high-side switch HD1 connected to the U-phase terminal of the motor MT, and may output an on-time signal VLS as shown in FIG. 5 to the second high-side switch HD2 connected to the V-phase terminal of the motor MT.

In detail, the output signal generating circuit 30 may compare a value of the first waveform signal WS1 with a value of the second waveform signal WS21 at each of a plurality of time points to determine a level of the on-time signal WLS at each of the plurality of time points.

For example, when the output signal generating circuit 30 determines that the (voltage or current) value of the waveform of the first waveform signal WS1 is larger than the (voltage or current) value of the second waveform signal WS21, the output signal generating circuit 30 outputs the on-time signal WLS at a first level (such as a low level).

Conversely, when the output signal generating circuit 30 determines that the (voltage or current) value of the waveform of the first waveform signal WS1 is smaller than the (voltage or current) value of the second waveform signal WS21, the output signal generating circuit 30 outputs the on-time signal WLS at a second level (such as a high level).

It should be understood that, the on-time signal WLS is at the high level during a working period of the on-time signal WLS, and the on-time signal WLS is at the low level during a non-working period of the on-time signal WLS. Time lengths of duty cycles of the on-time signal WLS depend on the values of the first waveform signal WS1 and the values of the second waveform signal WS21.

It should be noting that, in the embodiment, the first signal generating circuit 10 may adjust the first waveform signal WS1, and the second signal generating circuit 20 may adjust the second waveform signal WS21, according to a commutation state of the motor MT.

For example, the motor controller circuit of the embodiment of the present disclosure may further include a commutation detecting circuit 60. The commutation detecting circuit 60 may be connected to the first signal generating circuit 10 and the second signal generating circuit 20. The commutation detecting circuit 60 may be configured to detect the commutation state (including a plurality of commutation time points) of the motor MT to output a commutation signal PHS.

The first signal generating circuit 10 and the second signal generating circuit 20 may obtain a signal such as the commutation signal PHS as shown in FIG. 1 from the commutation detecting circuit 60, or obtain data having a message related to the commutation state of the motor MT from other circuits.

The first signal generating circuit 10 may determine and reset (duty cycles of the waveforms of) the first waveform signal WS1 outputted to the output signal generating circuit 30 within a time interval between one of the plurality of commutation time points and a next one of the plurality of commutation time points, according to the message related to the commutation state of the motor MT (that is indicated by the commutation signal PHS).

If necessary, the second signal generating circuit 20 may determine and reset (duty cycles of the waveforms of) the second waveform signal WS21 outputted to the output signal generating circuit 30 within the time interval between the one of the plurality of commutation time points and the next one of the plurality of commutation time points, according to the message related to the commutation state of the motor MT (indicated by the commutation signal PHS).

Figure 7:
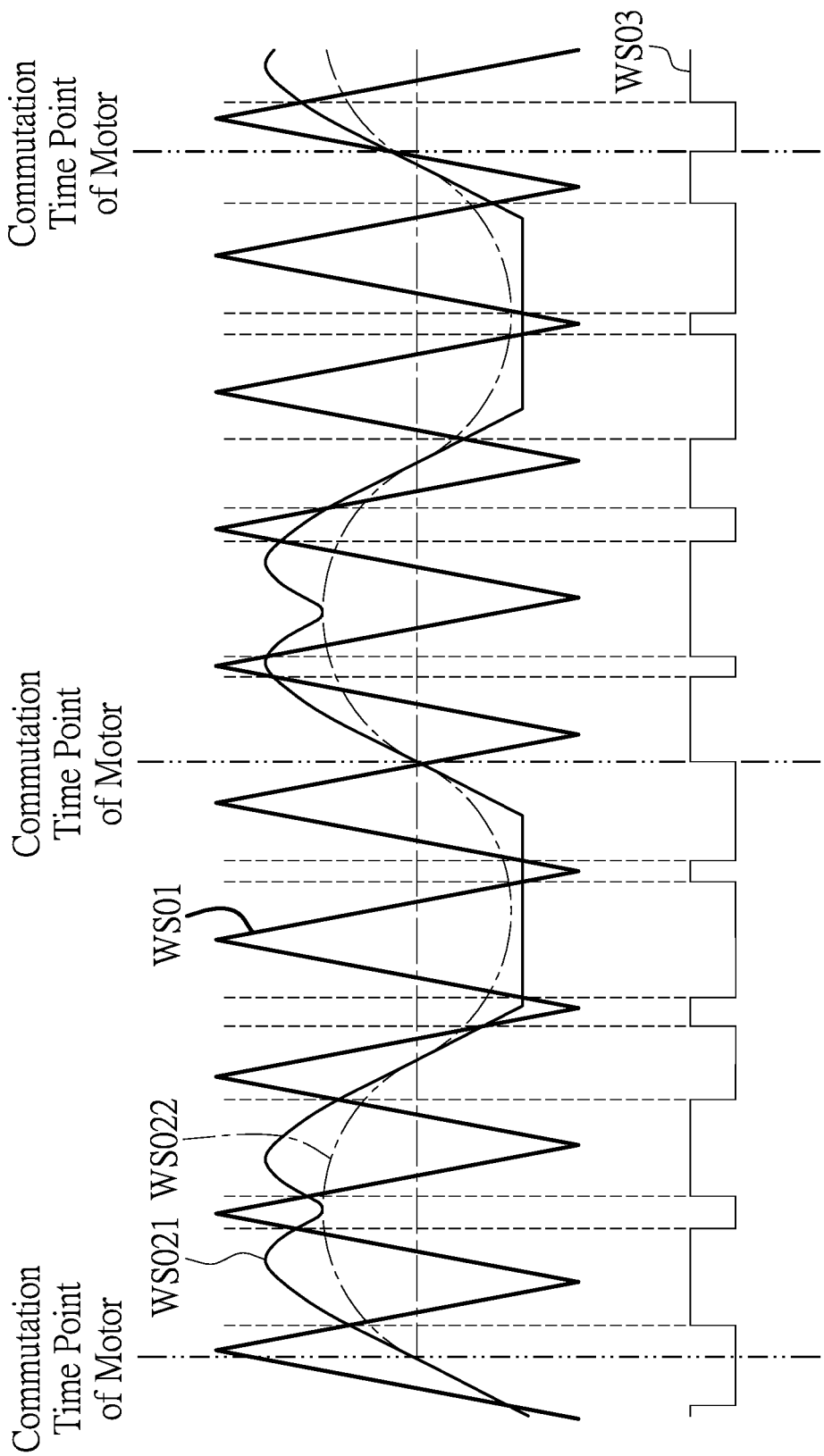
FIG. 7 is a waveform diagram of signals of a conventional motor controller circuit.

Reference is made to FIGS. 1, 2, 6 and 7, in which FIG. 1 is the block diagram of the motor controller circuit having the rotational speed locking mechanism according to an embodiment of the present disclosure, FIG. 2 is the circuit diagram of the bridge circuit of the motor controller circuit having the rotational speed locking mechanism according to the embodiment of the present disclosure, FIG. 6 is a waveform diagram of signals of the motor controller circuit having the rotational speed locking mechanism according to the embodiment of the present disclosure, and FIG. 7 is a waveform diagram of signals of a conventional motor controller circuit.

As shown in FIG. 7, each time when the motor MT commutates, the conventional motor controller circuit does not synchronously generate a first waveform signal WS01 and a second waveform signal WS201 or WS022. Then, the conventional motor controller circuit outputs an on-time signal WLS03 according to the first waveform signal WS01 and the second waveform signal WS201 or WS022. As a result, duty cycles of (a first one of) a plurality of waveforms of the on-time signal WLS03 outputted within a time interval between one and a next one of the plurality of commutation time points of the motor MT are different from that outputted within a time interval between the one and a previous one of the plurality of commutation time points of the motor MT.

For example, as shown in FIG. 7, the on-time signal WLS03 outputted to a high-side switch of the conventional motor controller circuit is at a low level at a first one of the plurality of commutation time points. The high-side switch is turned off according to the on-time signal WLS03 at the low level. At this time, the motor MT is not driven to rotate by the conventional motor controller circuit. After a certain time has elapsed, the on-time signal WLS03 transits from the low level to a high level. When the on-time signal WLS03 transits to the high level, the conventional motor controller circuit starts to turn on the high-side switch to drive the motor MT to rotate. However, as shown in FIG. 7, the on-time signal WLS03 outputted to the high-side switch of the conventional motor controller circuit is at the high level at a second one of the plurality of commutation time points. At this time, the conventional motor controller circuit instantly drives the motor MT to rotate.

As shown in FIG. 7, each time when the motor commutates at one of the plurality of commutation time points of the motor MT, by the conventional motor controller circuit, the duty cycles of the waveforms of the on-time signal WLS03 outputted within a time interval between the one and a next one of the plurality of commutation time points are different from that outputted within a time interval between the one and a previous one of the plurality of commutation time points. As a result, a rotational speed of the motor MT being driven by the conventional motor controller circuit is not a constant value. For example, a target rotational speed of the motor MT is 1000 RPM. However, after the motor MT commutates for a first time, an actual rotational speed of the motor MT is 990 RPM. Then, after the motor MT commutates for a second time, the actual rotational speed of the motor MT is 1100 RPM.

In contrast, each time when the motor MT commutates, the signal generating circuit of the motor controller circuit of the embodiment of the present disclosure synchronously outputs the first waveform signal WS1 and the second waveform signal WS21 or WS22 as shown in FIG. 6.

For example, as shown in FIG. 6, when the target rotational speed of the motor MT is maintained at a constant value, the first waveform signal WS1 outputted by the first signal generating circuit 10 and the second waveform signal WS21 (or WS22) outputted by the second signal generating circuit 20 within the time interval between the one and the previous one of the plurality of commutation time points of the motor MT are the same as that outputted within the time interval between the one and the next one of the plurality of commutation time points.

For example, by the signal generating circuit of the motor controller circuit of the embodiment of the present disclosure, (the duty cycles of) the third harmonic waveforms of the second waveform signal WS21 outputted within the time interval between the one and the previous one of the plurality of commutation time points of the motor MT are the same as that outputted within the time interval between the one and the next one of the plurality of commutation time points. Alternatively, by the signal generating circuit of the motor controller circuit of the embodiment of the present disclosure, (the duty cycles of) the sine waveforms of the second waveform signal WS22 outputted within the time interval between the one and the previous one of the plurality of commutation time points of the motor MT are the same as that outputted within the time interval between the one and the next one of the plurality of commutation time points.

Conversely, when the target rotational speed of the motor MT is changed, the first signal generating circuit 10 resets the first waveform signal WS1 and the second signal generating circuit 20 resets the second waveform signal WS21 (or WS22) at the one of the plurality of commutation time points. That is, the duty cycles of the first waveform signal WS1 outputted within the time interval between the one and the next one of the plurality of commutation time points are different from that outputted within the time interval between the one and the previous one of the plurality of commutation time points of the motor MT. The duty cycles of the second waveform signal WS21 (or WS22) outputted within the time interval between the one and the next one of the plurality of commutation time points are different from that outputted within the time interval between the one and the previous one of the plurality of commutation time points of the motor MT.

The output signal generating circuit 30 of the motor controller circuit of the embodiment of the present disclosure compares the value of the first waveform signal WS1 with the value of the second waveform signal WS21 or WS22 to output the waveform output signal WS3. The motor control circuit 40 of the motor controller circuit of the embodiment of the present disclosure outputs the on-time signal WLS according to the waveform output signal WS3.

It worth noting that, by the motor control circuit 40 of the motor controller circuit of the embodiment of the present disclosure, the duty cycles of a plurality of waveforms of the on-time signal WLS outputted within the time interval between the one and the previous one of the plurality of commutation time points of the motor MT are the same as that outputted within the time interval between the one and the next one of the plurality of commutation time points. As a result, the motor MT is driven to stably rotate at the target rotational speed by the motor controller circuit of the embodiment of the present disclosure.

If necessary, each time when the motor MT commutates, a rising edge of a first one of the plurality of waveforms of the on-time signal WLS outputted by the motor control circuit 40 of the motor controller circuit of the embodiment of the present disclosure is aligned with one of the plurality of commutation time points of the motor MT.

In conclusion, the present disclosure provides the motor controller circuit having the rotational speed locking mechanism. The waveforms (such as the triangular waveforms and the third harmonic waveforms) of the plurality of waveform signals are reset by the motor controller circuit of the present disclosure. Each time when the motor commutates at the one of the plurality of commutation time points of the motor, by the motor controller circuit of the present disclosure, the duty cycles of the on-time signal outputted within the time interval between the one and the next one of the plurality of commutation time points are the same as that outputted within the time interval between the one and the previous one of the plurality of commutation time points. As a result, the motor is driven to stably rotate at the same rotational speed by the motor controller circuit of the present disclosure, under the condition that noise generated by blades of a fan that are driven by the motor of the fan can be reduced.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A motor controller circuit having a rotational speed locking mechanism, which is applicable to a motor, the motor controller circuit comprising:
    a signal generator circuit, including:
        a first signal generating circuit configured to output a first waveform signal, and to reset the first waveform signal according to a commutation state of the motor each time when the motor commutates; and
        a second signal generating circuit configured to output a second waveform signal;
    an output signal generating circuit connected to the first signal generating circuit and the second signal generating circuit, and configured to output a waveform output signal according to the first waveform signal from the first signal generating circuit and the second waveform signal from the second signal generating circuit;
    a motor control circuit connected to the output signal generating circuit, and configured to output an on-time signal according to the waveform output signal from the output signal generating circuit; and
    a motor driving circuit connected to the motor control circuit and the motor, and configured to output a driving signal to the motor to drive the motor to rotate according to the on-time signal;
    wherein, each time when the motor commutates at one of a plurality of commutation time points of the motor, duty cycles of the on-time signal outputted, by the motor control circuit, within a time interval between the one and a next one of the plurality of commutation time points are the same as that outputted within a time interval between the one and a previous one of the plurality of commutation time points, under the condition that the motor rotates at a constant rotational speed.

2. The motor controller circuit according to claim 1, wherein, each time when the motor commutates at one of the plurality of commutation time points of the motor, waveforms of the first waveform signal outputted, by the first signal generating circuit, within a time interval between the one and a next one of the plurality of commutation time points are the same as that outputted within a time interval between the one and a previous one of the plurality of commutation time points.

3. The motor controller circuit according to claim 1, wherein a rising edge of a first one of a plurality of waveforms of the on-time signal outputted by the motor control circuit is aligned with a commutation time point of the motor.

4. The motor controller circuit according to claim 1, wherein, each time when the motor commutates, the second signal generating circuit resets the second waveform signal according the commutation state of the motor.

5. The motor controller circuit according to claim 1, wherein, each time when the motor commutates, the signal generating circuit synchronously outputs the first waveform signal and the second waveform signal.

6. The motor controller circuit according to claim 1, wherein, each time when the motor commutates at one of the plurality of commutation time points of the motor, waveforms of the second waveform signal outputted, by the second signal generating circuit, within a time interval between the one and a next one of the plurality of commutation time points are the same as that outputted within a time interval between the one and a previous one of the plurality of commutation time points.

7. The motor controller circuit according to claim 1, wherein waveforms of the first waveform signal include triangular waveforms, sawtooth waveforms or a combination thereof, and waveforms of the second waveform signal include sine waveforms, third harmonic waveforms or a combination thereof.

8. The motor controller circuit according to claim 1, wherein the output signal generating circuit compares a value of the first waveform signal with a value of the second waveform signal at each of a plurality of time points to determine a level of the on-time signal at each of the plurality of time points.

9. The motor controller circuit according to claim 1, wherein, when the output signal generator determines that a value of the first waveform signal is larger than a value of the second waveform signal, the motor control circuit outputs the on-time signal at a low level;
    wherein, when the output signal generator determines that the value of the first waveform signal is smaller than the value of the second waveform signal, the motor control circuit outputs the on-time signal at a high level.

* * * * *